(12) United States Patent
Liu

(10) Patent No.: US 8,103,166 B2
(45) Date of Patent: Jan. 24, 2012

(54) MULTI-WAVELENGTH COHERENT RECEIVER WITH A SHARED OPTICAL HYBRID AND A MULTI-WAVELENGTH LOCAL OSCILLATOR

(75) Inventor: Xiang Liu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 568 days.

(21) Appl. No.: 12/319,777

(22) Filed: Jan. 12, 2009

(65) Prior Publication Data
US 2010/0178056 A1    Jul. 15, 2010

(51) Int. Cl.
*H04J 14/06* (2006.01)

(52) U.S. Cl. .............. 398/65; 398/43; 398/46; 398/48; 398/74

(58) Field of Classification Search ............ 398/43, 398/46, 48, 65
See application file for complete search history.

(56) References Cited

U.S. PATENT DOCUMENTS

| | | | |
|---|---|---|---|
| 2004/0114939 A1* | 6/2004 | Taylor | 398/152 |
| 2007/0216988 A1 | 9/2007 | Caplan | 359/325 |
| 2010/0086303 A1* | 4/2010 | Qian et al. | 398/65 |
| 2010/0142952 A1* | 6/2010 | Qian et al. | 398/65 |

FOREIGN PATENT DOCUMENTS

| | | |
|---|---|---|
| EP | 0 445 943 A2 | 9/1991 |
| WO | PCT/US2010/020005 | 4/2010 |

OTHER PUBLICATIONS

Xiaoxu Li et al., "Electronic post-compensation of WDM transmission impairments using coherent detection and digital signal processing", *Optics Express*, vol. 16, No. 2, Jan. 21, 2008, pp. 880-888.

Yamada, E. et al., "1Tbit/s (111 Gbit/s/ch × 10 ch) no-guard-interval CO-OFDM transmission over 2100 km DSF", The Institution of Engineering and Technology, Electronics Letters, Nov. 20, 2008, pp. 1417-1419, vol. 44, No. 24.

* cited by examiner

*Primary Examiner* — Dung Nguyen
(74) *Attorney, Agent, or Firm* — D. M. La Bruno

(57) ABSTRACT

An exemplary apparatus for digital coherent detection of a multi-wavelength signal includes a polarization-diversity optical hybrid, at least four Wavelength De-Multiplexing (W-DMUX) filters, 4M detectors, and 4M analog-to-digital converters (ADCs), with M an integer greater than one. The hybrid has a first input for receiving a multi-wavelength signal including M sub-channels at different wavelengths, and a second input for receiving a reference light source including M continuous-wave references at different wavelengths that approximates center wavelengths of the M sub-channels. The hybrid has at least four outputs. A W-DMUX input for each W-DMUX filter is provided a corresponding one of the hybrid outputs, and each W-DMUX filter provides M filtered optical channel outputs. Each detector converts at least one of the filtered channel outputs into a corresponding electrical signal. Each ADC converts one of the electrical signals into a corresponding digital signal. The corresponding digital signals represent the M sub-channels.

20 Claims, 3 Drawing Sheets

$I_{x(y)} \propto C + REAL(S_{x(y)});$
$Q_{x(y)} \propto C + IMAG(S_{x(y)});$ $I_{x(y)} \propto REAL(S_{x(y)});$
$Q_{x(y)} \propto IMAG(S_{x(y)});$ ns, apparatuses and techniques for digital coherent detection.

BACKGROUND INFORMATION

Digital coherent detection (DCD) has recently emerged as an attractive technology for high-speed optical receivers by allowing for the access of both amplitude and phase information of a received optical signal, thereby enabling digital compensation of transmission impairments such as dispersion and Polarization Mode Dispersion (PMD). FIG. 1 illustrates a conventional digital coherent receiver 100. Optical Local Oscillator (OLO) 110 generates reference source R. Signal S and reference source R are provided to the input ports of a six-port Polarization Diversity-Optical Hybrid 120. In principle, the hybrid consists of linear dividers and combiners interconnected in such a way that four different vectorial additions of the reference source and the signal to be detected are obtained. For example, a polarization-diversity optical hybrid may be constructed by two polarization beam splitters (PBS's) and two optical hybrids. Each optical hybrid may be based on a Michelson interferometer or Michelson interferometer-like structure. For optical coherent detection, the six-port polarization-diversity optical hybrid mixes the incoming signal S with the reference source R to obtain four mixed signals, $(S_x+R_x)$, $(S_x+jR_x)$, $(S_y+R_y)$, and $(S_y+jR_y)$, where $S_x$ and $S_y$ are the optical fields of the two orthogonal polarization components of signal S, $R_x$ and $R_y$ are the optical fields of the two orthogonal polarization components of reference R, and j is the imaginary unit. The power waveforms of the four output mixed signals may then be detected by single-ended detectors (SD's) 125 and provided to Analog-to-Digital Converters (ADC) 130. The resultant digital domain signals $I_{x(y)}$ and $Q_{x(y)}$ are related to the in-phase (I) or real and the quadrature (Q) or imaginary components of each of the two polarization components of the signal S as, $I_{x(y)} \propto C+\text{real}(S_{x(y)})$, and $Q_{x(y)} \propto C+\text{imag}(S_{x(y)})$, where C is a constant. These digital signals are provided to a Digital Signal Processor (DSP) 140 for further processing. By applying suitable signal processing algorithms, the amplitude and phase of the unknown incoming signal S can be determined.

The polarization-diversity optical hybrid can be a ten-port device with two input ports and eight output ports, as shown in FIG. 2. The ten-port polarization-diversity optical hybrid 220 mixes the incoming signal S with the reference source R to obtain four pairs of mixed signals (or eight mixed signals), $(S_x\pm R_x)$, $(S_x\pm jR_x)$, $(S_y\pm R_y)$, and $(S_y\pm jR_y)$. The power waveforms of each pair of the output mixed signals may then be detected and compared by a balanced detector (BD) 225 and provided to an ADC 130. The resultant four digital domain signals $I_{x(y)}$ and $Q_{x(y)}$ are related to the in-phase (I) or real and the quadrature (Q) or imaginary components of each of the two polarization components of the signal S as, $I_{x(y)} \propto \text{real}(S_{x(y)})$, and $Q_{x(y)} \propto \text{imag}(S_{x(y)})$. These digital signals are provided to a Digital Signal Processor (DSP) 240 for further processing to determine the amplitude and phase of the unknown incoming signal S.

Future optical transport networks will demand increased signal data rates. However, with the anticipated future demand for higher signal data rates (e.g., 1-Tb/s), DCD is expected to be limited by the speed of ADCs. One way to avoid this bottleneck is to use multiple (e.g., 10×) sub-channels at different wavelengths to carry the ultrahigh-speed signal. At the receiver side, a Wavelength De-Multiplexing (W-DMUX) filter is first used to separate the sub-channels. A conventional digital coherent receiver may then be used for each of the sub-channels. In other words, such an approach proposes use of multiple (e.g., 10×) optical local oscillators (OLO's) and optical hybrids, each followed by four detectors and four ADCs, to receive the signal. Furthermore, to allow the receiver to be able to receive any multi-wavelength signal in the commonly used C-band (between about 1530 nm and 1565 nm), the W-DMUX needs to have about 80 output ports if the sub-channel spacing is 50 GHz, and for a different multi-wavelength signal, a different subset of the output ports needs to be physically connected to the optical hybrids. In addition, some such solutions utilizing multiwavelength signals require the local oscillators for all channels to be phase locked and parallelization of the post-compensation scheme to cover the entire spectrum of interest. Unfortunately, the complexity, cost, and inflexibility associated with these receiver approaches are quite high.

SUMMARY OF THE INVENTION

System, method and apparatus embodiments are provided for digital coherent detection of multi-wavelength signals. Provided exemplary embodiments of the invention permit substantial reductions in the complexity and cost of a digital coherent receiver for receiving an ultrahigh-speed signal that includes multiple wavelength sub-channels.

An exemplary apparatus includes a polarization-diversity optical hybrid, at least four Wavelength De-Multiplexing (W-DMUX) filters, 4M detectors, and 4M ADCs, wherein M is an integer greater than one. The polarization-diversity optical hybrid has a first input for receiving a multi-wavelength signal including M sub-channels, each sub-channel at a different wavelength, and a second input for receiving a reference light source including M continuous-wave references, each continuous-wave reference at a different wavelength that approximates a center wavelength of one of the M sub-channels. The polarization-diversity optical hybrid also has at least four outputs. Each W-DMUX filter has a W-DMUX input, with each of the W-DMUX inputs provided a corresponding one of the outputs of the polarization-diversity optical hybrid, and each W-DMUX filter providing M filtered optical channel outputs. Each of the 4M detectors converts at least one of the filtered channel outputs into a corresponding electrical signal. Each of the 4M ADCs converts one of the electrical signals into a corresponding digital signal. Thus are recovered corresponding digital signals representing the M sub-channels.

In one embodiment, the apparatus further includes a digital signal processor for processing the corresponding digital signals and retrieving content of the multi-wavelength signal. The corresponding digital signals represent the M sub-channels. Other embodiments also include a multi-wavelength optical local oscillator (MW-OLO), the MW-OLO for providing the M continuous-wave references. The MW-OLO may comprise M independent continuous-wave laser sources at different wavelengths and a wavelength-combining device. In other embodiments, the MW-OLO may comprise at least one continuous wave laser source and at least one phase or amplitude modulator. The MW-OLO may be tunable.

In one embodiment, the polarization-diversity optical hybrid provides four outputs representing the in-phase and quadrature components of each of two orthogonal polarization components of the multi-wavelength signal. In another embodiment, the polarization-diversity optical hybrid provides four pairs of outputs, the two outputs of each pair being correlated, representing in-phase and quadrature components of each of two orthogonal polarization components of the multi-wavelength signal. In such an embodiment, the apparatus includes eight W-DMUX filters, each of the W-DMUX inputs provided a corresponding one of the eight outputs of the polarization-diversity optical hybrid; and each detector is a balanced detector for converting two of the filtered channel outputs into a corresponding electrical signal, the two filter channel outputs are correlated with respect to each other.

The polarization-diversity optical hybrid may include at least one polarization beam splitter (PBS). The multi-wavelength signal may be a polarization-division multiplexed (PDM) signal. The multi-wavelength signal may be an optical orthogonal frequency-division multiplexing (OFDM) signal. Each of the W-DMUX filters may have a periodic frequency selective property such that a series of equally-spaced frequencies with a spacing that is equal to at least M times the spacing of the sub-channels is routed to one of the output ports of the W-DMUX filter. For example, the series may have a spacing that is M or M+1 times the spacing of the sub-channels. In one embodiment, the apparatus of claim 1 wherein the frequency spacing between the sub-channels of the multi-wavelength signal is about 50 GHz. The W-DMUX filters may be integrated in a planar lightwave circuit (PLC) to reduce size and cost, and to ease the timing alignments among the sub-channels.

One apparatus embodiment may include a tunable optical filter, the tunable optical filter for outputting the multi-wavelength signal provided to the first input of the polarization-diversity optical hybrid. In various apparatus embodiments, the sampling rate of the ADCs may be approximately the frequency spacing of the sub-channels of the multi-wavelength signal.

In another exemplary embodiment, a multi-wavelength coherent receiver comprises a polarization-diversity optical hybrid, the polarization-diversity optical hybrid adapted to receive a multi-wavelength signal including M sub-channels at different wavelengths, adapted to receive a reference light source including M continuous-wave sources at different wavelengths that approximate center wavelengths of the M sub-channels, and adapted to output four optical signals representing the in-phase and quadrature components of each of two orthogonal polarization components of the multi-wavelength signal. The exemplary multi-wavelength coherent receiver further includes four W-DMUX filters, each W-DMUX filter adapted to receive one of the optical signals output from the optical hybrid, and adapted to output M single-wavelength signals; 4M detectors, each detector adapted to convert one of the filtered single-wavelength signals into a corresponding electrical signal, a set of four of the single-wavelength signals with one single-wavelength signal from each W-DMUX filter representing a first sub-channel; 4M ADCs, each ADC adapted to convert one of the electrical signals into a corresponding digital signal; and a digital signal processor adapted to process a set of four of the corresponding digital signals representing the first sub-channel in order to retrieve content for the first sub-channel of the multi-wavelength signal.

In another embodiment, the multi-wavelength coherent receiver includes a MW-OLO, the MW-OLO adapted to provide the M continuous-wave sources. The multi-wavelength coherent receiver may also include a tunable optical filter, the tunable optical filter adapted to output the multi-wavelength signal provided to the first input of the polarization-diversity optical hybrid.

In one exemplary embodiment, a multi-wavelength coherent receiver includes a polarization-diversity optical hybrid, the polarization-diversity optical hybrid adapted to receive a multi-wavelength signal including M sub-channels at different wavelengths, adapted to receive a reference source including M continuous-wave sources at different wavelengths that approximate center wavelengths of the M sub-channels, and adapted to output eight optical signals representing in-phase and quadrature components of each of two orthogonal polarization components of the multi-wavelength signal. The exemplary multi-wavelength coherent receiver further includes eight W-DMUX filters, each W-DMUX filter adapted to receive one of the output optical signals from the optical hybrid, and adapted to output M single-wavelength signals; 4M detectors, each detector being a balanced detector for converting two of the filtered single-wavelength outputs that are correlated with respect to each other into a corresponding electrical signal, a set of eight of the single-wavelength signals with one single-wavelength signal from each W-DMUX filter representing a first sub-channel; 4M ADCs, each ADC for converting one of the electrical signals into a corresponding digital signal; and a digital signal processor adapted to process a set of four of the corresponding digital signals representing the first sub-channel in order to retrieve content for the first sub-channel of the multi-wavelength signal.

Each W-DMUX filter may have a periodic frequency selective property such that a series of equally-spaced frequencies with a spacing that is equal to at least M times the spacing of the sub-channels is routed to one of the output ports of the W-DMUX filter.

An exemplary method includes receiving a multi-wavelength signal including M sub-channels, each sub-channel at a different wavelength; receiving a reference source including M continuous-wave references, each continuous-wave reference at a different wavelength that approximates a center wavelength of one of the M sub-channels; mixing the multi-wavelength signal and the reference signal into at least four output signals corresponding to the in-phase and quadrature components of each of two orthogonal polarization components of the multi-wavelength signal; filtering each of the output signals into M single-wavelength signals; converting the single-wavelength signals corresponding to least one sub-channel to the digital domain; and processing corresponding digital signals for the at least one sub-channel to retrieve content for the at least one sub-channel of the multi-wavelength signal.

Reference herein to "one embodiment", "another embodiment", "an exemplary embodiment" and "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. Although various embodiments which incorporate the teachings of the present invention have been shown and described in detail herein, those skilled in the art can readily devise many other varied embodiments that still incorporate these teachings.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein, the term "and" is used in both the conjunctive and disjunctive sense and includes any and all combinations of one or more of the associated listed items. The singular forms "a", "an" and "the" are intended to include the plural forms as well, unless the context clearly indicates otherwise. It will be further understood that the terms "comprises", "comprising", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
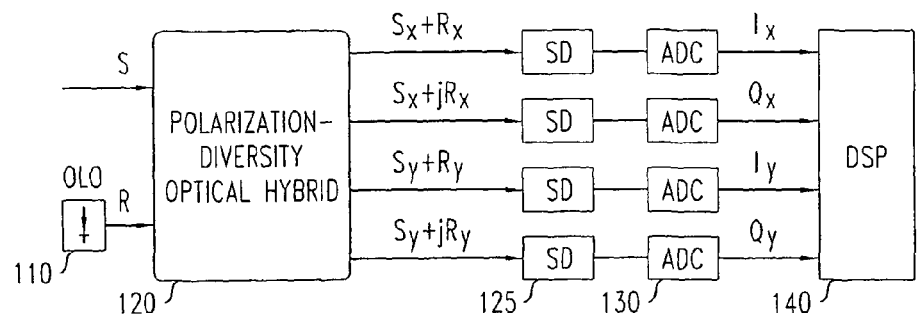
FIG. 1 is a schematic diagram of an exemplary conventional digital coherent receiver with a six-port polarization-diversity optical hybrid.
Figure 2:
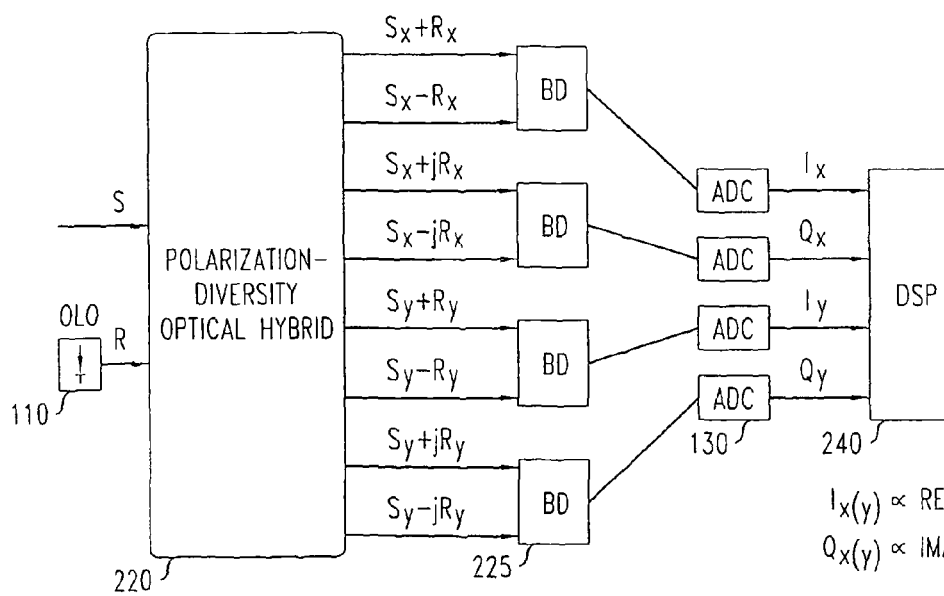
FIG. 2 is a schematic diagram of an exemplary conventional digital coherent receiver with a ten-port polarization-diversity optical hybrid.
Figure 3:
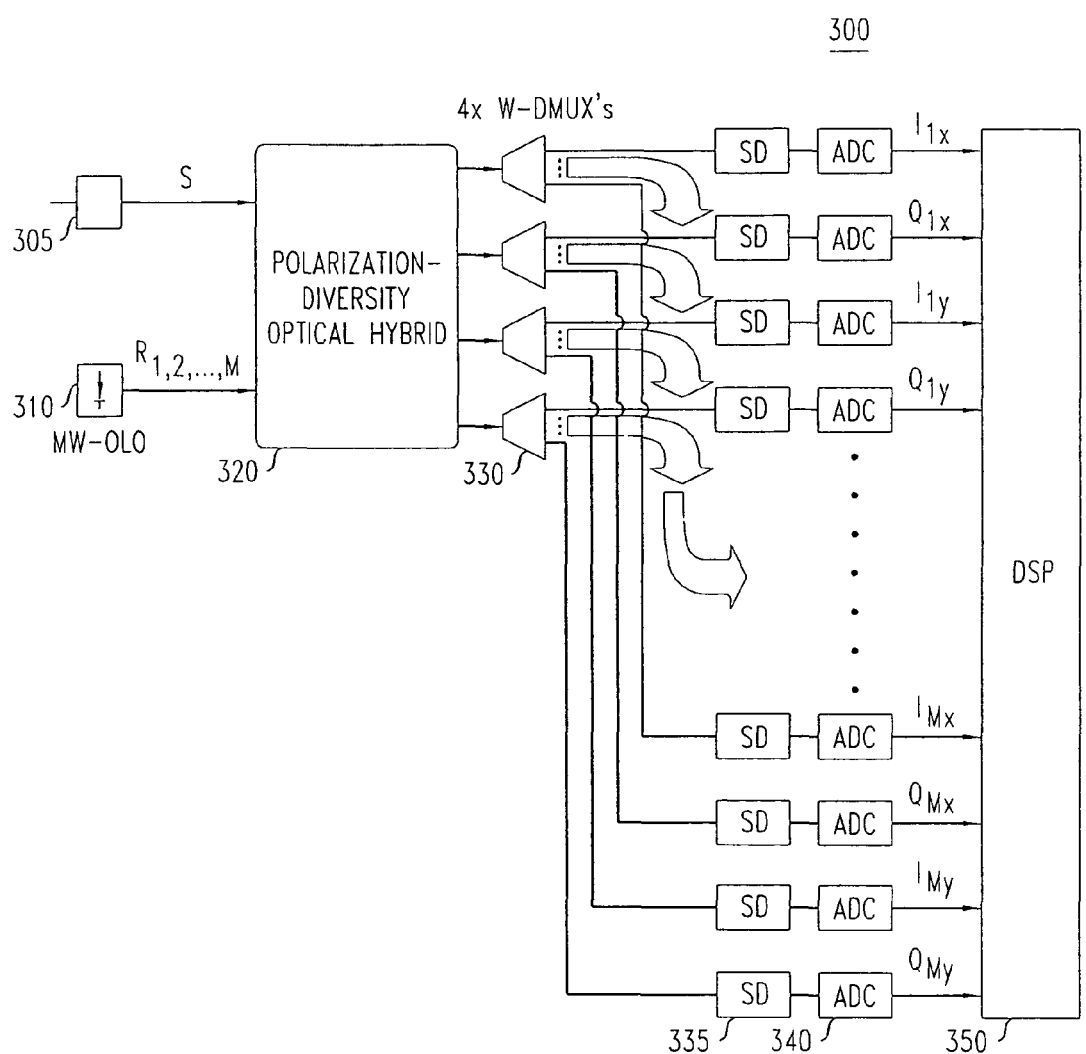
FIG. 3 is a schematic diagram of an exemplary multi-wavelength coherent receiver with a six-port polarization-diversity optical hybrid in accordance of one embodiment of the invention.

FIG. 3 is a schematic diagram of an exemplary multi-wavelength coherent receiver 300 in accordance of one embodiment of the invention. The multi-wavelength coherent receiver 300 receives multi-wavelength signal S. The multi-wavelength signal includes M sub-channels. Each sub-channel of the multi-wavelength signal has a different wavelength. The multi-wavelength signal may be an optical orthogonal frequency-division multiplexing (OFDM) signal.

Orthogonal frequency-division multiplexing (OFDM) is a widely used digital modulation/multiplexing technique. Coherent optical orthogonal frequency-division multiplexing (CO-OFDM) is being considered as a promising technology for future high-speed optical transport systems. In a polarization-division multiplexed (PDM) signal, the signal is represented by two orthogonal polarization components. Thus, an optical PDM-OFDM signal has a complex digital waveform representing the optical field of each of two orthogonal polarization components. The multi-wavelength signal may be an optical PDM-OFDM signal.

Multi-wavelength optical local oscillator (MW-OLO) 310 generates reference source R. The MW-OLO provides M continuous-wave references and may be a component of the multi-wavelength coherent receiver. Each continuous-wave reference has a different wavelength, these wavelengths corresponding to and approximating the center wavelengths of the M sub-channels of the multi-wavelength signal S. For example, each continuous-wave reference has a different wavelength that approximates a center wavelength of one of the M sub-channels. The MW-OLO may comprise M independent continuous-wave laser sources at different wavelengths and a wavelength-combining device. The MW-OLO may also comprise at least one continuous wave laser source and at least one phase or amplitude modulator. The MW-OLO may be tunable. In one embodiment, the MW-OLO may include a wavelength combining device or a wavelength multiplexer. In another embodiment, the MW-OLO may include a comb generator. The MW-OLO may be shared between the receiver and a transmitter in a transceiver.

The multi-wavelength receiver 300 includes the polarization-diversity optical hybrid 320, at least four W-DMUX filters 330, 4M detectors 335, and 4M ADCs 340, wherein M is an integer greater than one (wherein 4M means 4 'times' M of the named elements). Signal S and reference source R are provided to the input ports of Polarization Diversity-Optical Hybrid 320.

A first input of the polarization-diversity optical hybrid receives the multi-wavelength signal S, which includes the M sub-channels, each sub-channel at a different wavelength. A second input of the polarization-diversity optical hybrid receives the reference source R which includes the M continuous-wave references, each continuous-wave reference at a different wavelength that approximates a center wavelength of one of the M sub-channels. The hybrid includes linear dividers and combiners interconnected in such a way that various, different vectorial additions of the reference signal and the signal to be detected are the outputs. For example, a polarization-diversity optical hybrid may be constructed by two polarization beam splitters (PBS's) and two optical hybrids. Each optical hybrid may be based on a Michelson interferometer or Michelson interferometer-like structure. The polarization-diversity optical hybrid has at least four outputs. In one embodiment and as illustrated in FIG. 3, the polarization-diversity optical hybrid provides four outputs, $(S_x+R_x)$, $(S_x+jR_x)$, $(S_y+R_y)$, and $(S_y+jR_y)$, representing the in-phase and quadrature components of each of two orthogonal polarization components of the multi-wavelength signal.

Each W-DMUX filter 330 has a W-DMUX input. Each of the W-DMUX inputs is provided a corresponding one of the outputs of the polarization-diversity optical hybrid. As shown in FIG. 3, each of the four outputs is provided to a W-DMUX filter. Each W-DMUX filter provides M filtered optical channel outputs. Filtered optical channel outputs are provide to the 4M detectors 335. A W-DMUX filter may be an arrayed wavelength grating (AWG) filter.

Each of the detectors 335 converts at least one of the filtered channel outputs into a corresponding electrical signal. In an embodiment employing balanced detection, which is further described in the following, two filter channel outputs are provided to each detector. The corresponding electrical signal from a detector is provided to an ADC 240.

Each of the 4M ADCs 340 converts one of the electrical signals into a corresponding digital signal. Thus, each ADC converts a provided electrical signal to a corresponding digital signal. The sampling rate of the ADCs may be approximately the frequency spacing of the sub-channels of the multi-wavelength signal. For example, a multi-wavelength signal may contain sub-channels spaced 50 GHz apart, and the sampling rate approximates that spacing. In this manner, corresponding digital signals representing the M sub-channels are recovered.

The resultant digital domain signals are provided to a Digital Signal Processor (DSP) 350 for further processing. By applying suitable signal processing algorithms, the amplitude and phase of the unknown incoming signal can be determined. Each sub-channel is represented by a set of digital signals, the set of digital signals comprising one digital signal from each output of the hybrid. The set of digital signals can be processed to recover the content of a sub-channel of the multi-wavelength signal. While the sub-channels may be independently processed, the may collectively form data for the entire multi-wavelength signal.

For example, symbol synchronization may be performed on the digital domain signals. The DSP may include modules for prefix/training symbol removal, signal compensation, serial-to-parallel conversion, Fast Fourier Transform (FFT), channel estimation and compensation, symbol mapping, and parallel-to-serial conversion leading to a reconstruction of the original data provided to the transmitter. Additional details concerning the processing of digital domain signals for a sub-channel and compensations of received signals to recover content are described in U.S. patent application Ser. No. 12/215,740 entitled System, Method And Apparatus For Channel Estimation With Dual Polarization Training Symbols For Coherent Optical OFDM, filed Jun. 20, 2008; U.S. patent application Ser. No. 12/215,740 entitled System, Method And Apparatus For Channel Estimation Based on Intra-Symbol Frequency Domain Averaging For Coherent Optical OFDM, filed Jun. 20, 2008; and U.S. patent application Ser. No. 12/288,794 entitled System, Method And Apparatus For Joint Self Phase Modulation Compensation For Coherent Optical Polarization-Division-Multiplexed Orthogonal-Frequency Division-Multiplexing Systems, filed Oct. 23, 2008, which are herein incorporated by reference.

As illustrated in FIG. 3, the polarization-diversity optical hybrid has four outputs. And the detectors are single-ended detectors. For optical coherent detection with a six-port polarization-diversity optical hybrid, the hybrid mixes the incoming signal S with the reference source R to output four mixed signal outputs.

Figure 4:
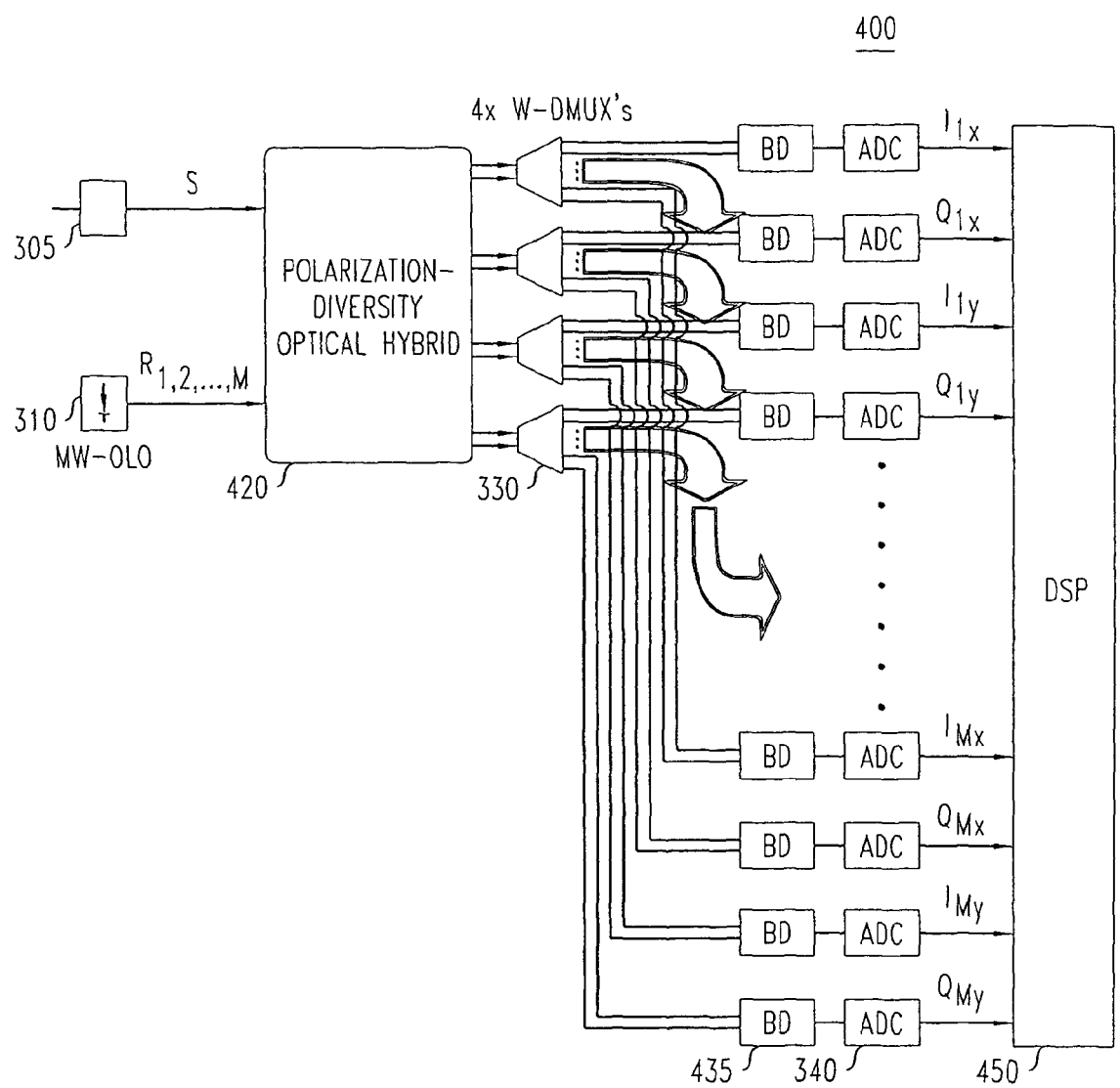
FIG. 4 is a schematic diagram of an exemplary multi-wavelength coherent receiver with a ten-port polarization-diversity optical hybrid in accordance of one embodiment of the invention.

In another embodiment, the polarization-diversity optical hybrid provides four pairs of mixed signals (or eight mixed signals), namely $(S_x \pm R_x)$, $(S_x \pm jR_x)$, $(S_y \pm R_y)$, and $(S_y + jR_y)$, as illustrated in FIG. 4. The eight outputs (after detection) represent the in-phase and quadrature components of each of two orthogonal polarization components of the multi-wavelength signal. In such an embodiment, the apparatus includes eight W-DMUX filters 330, each of the W-DMUX inputs provided a corresponding one of the eight outputs of the polarization-diversity optical hybrid 420; and each detector 435 is a balanced detector for converting two of the filtered channel outputs into a corresponding electrical signal, the two filtered channel outputs correlated with respect to each other. Thus, after balanced detection, there will be 4 outputs, $(I_{nx}, Q_{nx}, I_{ny}, Q_{ny})$ for the n-th sub-channel. These electronic signals can be related to the real and imaginary parts of optical field of the n-th sub-channel, $S_n$, as $I_{nx(y)} \propto \text{real}(S_{nx(y)})$, and $Q_{nx(y)} \propto \text{imag}(S_{nx(y)})$. A W-DMUX filter may be an arrayed wavelength grating (AWG) filter. The W-DMUX filter may be integrated in a planar lightwave circuit (PLC). A PLC may include the polarization-diversity optical hybrid and the W-DMUX filters. The polarization-diversity optical hybrid may also be made of free-space optics.

In one embodiment, the multi-wavelength coherent receiver 300, 400 may include a tunable optical filter 305, 405 respectively. The tunable optical filter is adapted to output the multi-wavelength signal provided to the first input of the polarization-diversity optical hybrid. For instance, the tunable optical filter may filter a wavelength-division multiplexed (WDM) signal, which may comprise multiple multi-wavelength signals, for resultant output of one multi-wavelength signal provided to the first input of the polarization-diversity optical hybrid. This tunable optical filter is optional, however, and not required, because the selection or filtering of a given multi-wavelength signal can be realized by tuning the MW-OLO such that its M continuous-wave references approximate the center wavelengths of the M sub-channels of the multi-wavelength signal to be selected. In this case, the selection or filtering of the multi-wavelength signal is effectively done in the electronic domain through RF filtering.

Preferably, each of the W-DMUX filters has a periodic frequency selective property such that a series of equally-spaced frequencies with a spacing that is equal to at least M times the spacing of the sub-channels is routed to one of the output ports of the W-DMUX filter. For example, M may refer to the number of sub-channels to be received, and the W-DMUX can have M outputs when no guard-band is used or >M outputs when a guard-band is used. In that case, only the M data-containing outputs would be processed to recover data. With the periodic frequency selective property, a cyclic wavelength de-multiplexing feature can be enabled. By the cyclic wavelength de-multiplexing feature, any pre-determined multi-wavelength signal in a WDM system having multiple multi-wavelength signals at different wavelength locations (e.g., in the C-band) may be received by the same multi-wavelength coherent receiver without physically changing the W-DMUX's or the physical connections between the W-DMUX's and the detectors. This makes the multi-wavelength coherent receiver flexible or wavelength-agile. For example, in a WDM system which has 8 multi-wavelength signals at different wavelength locations in the C-band, each containing 10 sub-channels on a 50-GHz grid:

Multi-wavelength signal 1 at locations #1-10; (for its 10 sub-channels);

Multi-wavelength signal 2 at locations #11-20;

. . .

Multi-wavelength signal 8 at locations #71-80.

(Here, locations #1,2,3, . . . ,80 are 80 consecutive optical frequency locations with a spacing of 50 GHz.) then, a target multi-wavelength channel may be mixed in the polarization-diversity optical hybrid of the exemplary receiver with a MW-OLO whose sub-wavelengths are aligned roughly with those of the multi-wavelength signal. Accordingly, the MW-OLO is tunable as well in one embodiment. Each of the W-DMUXs may have 1 input port and 10 outputs that output frequency bands containing those centered at the following locations in a "cyclic or periodic" fashion:

W-DMUX output 1: locations #1,11,21,31, . . . 71;
W-DMUX output 2: locations #2,12,22,32, . . . 72;
. . .
W-DMUX output 10: locations #10,20,30, . . . 80.

The 3-dB bandwidth of each of the frequency bands for each output of the W-DMUX filter may be about the spacing between the frequency bands, which is 50 GHz for this example case.

As another example, in a WDM system having 8 multi-wavelength signals at different wavelength locations in the C-band, each containing 9 sub-channels on a 50-GHz grid:

Multi-wavelength signal 1 at locations #1-9; (for its 9 sub-channels);
Multi-wavelength signal 2 at locations #11-19;
. . .
Multi-wavelength signal 8 at locations #71-79.

Each of the W-DMUX's may have 10 outputs that output frequency bands containing those centered at the following locations in a "cyclic or periodic" fashion:

W-DMUX output 1: locations #1,11,21,31, . . . 71;
W-DMUX output 2: locations #2,12,22,32, . . . 72;
. . .
W-DMUX output 9: locations #9,19,29,39, . . . 79;
W-DMUX output 10: locations #10,20,30, . . . 80. (not to be used)

In the above example, there is effectively a guard band between multi-wavelength signals, which may be beneficial for reducing the crosstalk between these signals.

As previously mentioned, the detector may be a single-ended detector with one input or a balanced detector with two inputs. With both single-ended and balanced detection, there is only one output from each detector, and the number of ADCs in the receiver will remain 4M. The apparatus may further include a digital signal processor for processing the corresponding digital signals and retrieving content of the multi-wavelength signal. The corresponding digital signals from the ADCs represent the M sub-channels. By applying suitable signal processing algorithms, the amplitude and phase of the unknown incoming signal can be determined. Furthermore, the sub-channels may be independently processed but collectively form data for the entire multi-wavelength signal. For example, ten 100-Gb/s sub-channels of a multi-wavelength signal can be collectively processed to obtain the 1-Tb/s data contained in the multi-wavelength signal.

The multi-wavelength coherent receiver of the invention includes a polarization-diversity optical hybrid having at least four outputs. Thus, as illustrated in the exemplary embodiment of FIG. 3, the multi-wavelength coherent receiver 300 comprises a polarization-diversity optical hybrid 320 adapted to output four optical signals representing in-phase and quadrature components of each of two orthogonal polarization components of the multi-wavelength signal. This exemplary embodiment further includes four W-DMUX filters 330, each W-DMUX filter adapted to receive one of the optical signals output from the optical hybrid, and adapted to output M single-wavelength signals; 4M detectors 335, each detector adapted to convert one of the filtered single-wavelength signals into a corresponding electrical signal, a set of four of the single-wavelength signals with one single-wavelength signal from each W-DMUX filter representing a first sub-channel; 4M ADCs 340, each ADC adapted to convert one of the electrical signals into a corresponding digital signal; and a digital signal processor 350 adapted to process a set of four of the corresponding digital signals representing the first sub-channel in order to retrieve content for the first sub-channel of the multi-wavelength signal.

In another exemplary embodiment illustrated in FIG. 4, a multi-wavelength coherent receiver includes a polarization-diversity optical hybrid 420 is adapted to output eight optical signals representing in-phase and quadrature components of each of two orthogonal polarization components of the multi-wavelength signal. This exemplary multi-wavelength coherent receiver further includes eight W-DMUX filters 330, each W-DMUX filter adapted to receive one of the output optical signals from the optical hybrid, and adapted to output M single-wavelength signals; 4M detectors 435, each detector being a balanced detector for converting two of the filtered single-wavelength outputs that are correlated with respect to each other into a corresponding electrical signal, a set of eight of the single-wavelength signals with one single-wavelength signal from each W-DMUX filter representing a first sub-channel; 4M ADCs 340, each ADC for converting one of the electrical signals into a corresponding digital signal; and a digital signal processor 450 adapted to process a set of four of the corresponding digital signals representing the first sub-channel in order to retrieve content for the first sub-channel of the multi-wavelength signal.

An exemplary method of digital coherent detection includes receiving a multi-wavelength signal S and receiving a reference source including M continuous-wave references. The multi-wavelength signal includes M sub-channels, each sub-channel at a different wavelength. Each continuous-wave reference is at a different wavelength that approximates a center wavelength of one of the M sub-channels. The multi-wavelength signal and the reference signal are mixed into at least four output signals corresponding to the in-phase and quadrature components of each of two orthogonal polarization components of the multi-wavelength signal. Each of the output signals are filtered into M single-wavelength signals. The single-wavelength signals corresponding to least one sub-channel are converted to the digital domain and the corresponding digital signals for the at least one sub-channel are processed to retrieve content for the at least one sub-channel of the multi-wavelength signal.

The method functions described above are readily carried out by optical devices and special or general purpose digital information processing devices acting under appropriate instructions embodied, e.g., in software, firmware, or hardware programming. For example, functional modules of the DSP and the other logic circuits can be implemented as an ASIC (Application Specific Integrated Circuit) constructed with semiconductor technology. Alternatively, various modules may be implemented with FPGA (Field Programmable Gate Arrays) and other hardware blocks. As such, the process steps described herein are intended to be broadly interpreted as being equivalently performed by software, hardware and a combination thereof in various alternative embodiments.

What is claimed is:

1. An apparatus comprising:
 a polarization-diversity optical hybrid, the polarization-diversity optical hybrid having a first input for receiving a multi-wavelength signal including M sub-channels, each sub-channel at a different wavelength, the optical hybrid having a second input for receiving a reference light source including M continuous-wave references, each continuous-wave reference at a different wavelength that approximates a center wavelength of one of the M sub-channels, the optical hybrid having at least four outputs;
 at least four Wavelength De-Multiplexing (W-DMUX) filters, each W-DMUX filter having a W-DMUX input, each of the W-DMUX inputs provided a corresponding one of the outputs of the optical hybrid, each W-DMUX filter providing M filtered optical channel outputs;

4M detectors, each detector for converting at least one of the filtered channel outputs into a corresponding electrical signal; and 4M analog-to-digital converters (ADCs), each ADC for converting one of the electrical signals into a corresponding digital signal;

wherein M is an integer greater than one.

2. The apparatus of claim 1, further comprising:
a digital signal processor for processing the corresponding digital signals and retrieving content of the multi-wavelength signal, the corresponding digital signals representing the M sub-channels.

3. The apparatus of claim 1, further comprising:
a multi-wavelength optical local oscillator (MW-OLO), the MW-OLO adapted to provide the M continuous-wave references.

4. The apparatus of claim 3 wherein the MW-OLO comprises M independent continuous-wave laser sources at different wavelengths and a wavelength-combining device.

5. The apparatus of claim 3 wherein the MW-OLO comprises at least one continuous wave laser source and at least one phase or amplitude modulator.

6. The apparatus of claim 3 wherein the MW-OLO is tunable.

7. The apparatus of claim 1 wherein the polarization-diversity optical hybrid provides four outputs representing the in-phase and quadrature components of each of two orthogonal polarization components of the multi-wavelength signal.

8. The apparatus of claim 1 wherein the polarization-diversity optical hybrid provides eight outputs, the eights outputs representing in-phase and quadrature components of each of two orthogonal polarization components of the multi-wavelength signal.

9. The apparatus of claim 8 having eight W-DMUX filters, each of the W-DMUX inputs provided a corresponding one of the eight outputs of the polarization-diversity optical hybrid;
wherein each detector is a balanced detector for converting two of the filtered channel outputs into a corresponding electrical signal, the two filter channel outputs correlated with respect to each other.

10. The apparatus of claim 1 wherein each W-DMUX filter has a periodic frequency selective property such that a series of equally-spaced frequencies with a spacing that is equal to at least M times the spacing of the sub-channels is routed to one of the output ports of the W-DMUX filter.

11. The apparatus of claim 1 wherein the frequency spacing between the sub-channels of the multi-wavelength signal is approximately 50 GHz.

12. The apparatus of claim 1 wherein the multi-wavelength signal is a polarization-division multiplexed (PDM) signal.

13. The apparatus of claim 1 wherein the W-DMUX filters are integrated in a planar lightwave circuit (PLC).

14. The apparatus of claim 1 further including a tunable optical filter, the tunable optical filter for outputting the multi-wavelength signal provided to the first input of the polarization-diversity optical hybrid.

15. The apparatus of claim 1 wherein the sub-channels of the multi-wavelength signal have a frequency spacing and wherein a sampling rate of the ADCs is approximately the frequency spacing of the sub-channels.

16. A multi-wavelength coherent receiver comprising:
a polarization-diversity optical hybrid, the polarization-diversity optical hybrid adapted to receive a multi-wavelength signal including M sub-channels at different wavelengths, adapted to receive a reference light source including M continuous-wave sources at different wavelengths that approximate center wavelengths of the M sub-channels, and adapted to output four optical signals representing in-phase and quadrature components of each of two orthogonal polarization components of the multi-wavelength signal;

four Wavelength De-Multiplexing (W-DMUX) filters, each W-DMUX filter adapted to receive one of the optical signals output from the optical hybrid, and adapted to output M single-wavelength signals;

4M detectors, each detector adapted to convert one of the filtered single-wavelength signals into a corresponding electrical signal, a set of four of the single-wavelength signals with one single-wavelength signal from each W-DMUX filter representing a first sub-channel;

4M analog-to-digital converters (ADCs), each ADC adapted to convert one of the electrical signals into a corresponding digital signal; and a digital signal processor adapted to process a set of four of the corresponding digital signals representing the first sub-channel in order to retrieve content for the first sub-channel of the multi-wavelength signal; wherein M is an integer greater than one.

17. The multi-wavelength coherent receiver of claim 16 wherein each W-DMUX filter has a periodic frequency selective property such that a series of equally-spaced frequencies with a spacing that is equal to at least M times the spacing of the sub-channels is routed to one of the output ports of the W-DMUX filter.

18. A multi-wavelength coherent receiver comprising:
a polarization-diversity optical hybrid, the polarization-diversity optical hybrid adapted to receive a multi-wavelength signal including M sub-channels at different wavelengths, adapted to receive a reference light source including M continuous-wave sources at different wavelengths that approximate center wavelengths of the M sub-channels, and adapted to output eight optical signals representing in-phase and quadrature components of each of two orthogonal polarization components of the multi-wavelength signal;

eight Wavelength De-Multiplexing (W-DMUX) filters, each W-DMUX filter adapted to receive one of the output optical signals from the optical hybrid, and adapted to output M single-wavelength signals;

4M detectors, each detector being a balanced detector for converting two of the filtered single-wavelength outputs that are correlated with respect to each other into a corresponding electrical signal, a set of eight of the single-wavelength signals with one single-wavelength signal from each W-DMUX filter representing a first sub-channel;

4M analog-to-digital converters (ADCs), each ADC for converting one of the electrical signals into a corresponding digital signal; and a digital signal processor adapted to process a set of four of the corresponding digital signals representing the first sub-channel in order to retrieve content for the first sub-channel of the multi-wavelength signal; wherein M is an integer greater than one.

19. A method comprising
receiving a multi-wavelength signal including M sub-channels, each sub-channel at a different wavelength;
receiving a reference light source including M continuous-wave references, each continuous-wave reference at a different wavelength that approximates a center wavelength of one of the M sub-channels;
mixing the multi-wavelength signal and the reference light source into at least four output signals corresponding to the in-phase and quadrature components of each of two orthogonal polarization components of the multi-wavelength signal;

filtering each of the output signals into M single-wavelength signals by a W-DMUX filter;
converting the single-wavelength signals corresponding to least one sub-channel to the digital domain; and
processing corresponding digital signals for the at least one sub-channel to retrieve content for the at least one sub-channel of the multi-wavelength signal; wherein M is an integer greater than one.

20. The method of claim 19 wherein the W-DMUX filter has a periodic frequency selective property such that a series of equally-spaced frequencies with a spacing that is equal to at least M times the spacing of the sub-channels is routed to one of the output ports of the W-DMUX filter.

\* \* \* \* \*